Feb. 4, 1936. H. E. MILLER Re. 19,845

GUY WIRE PROTECTOR

Original Filed Feb. 28, 1931

Inventor
HERBERT E. MILLER

C. L. Parker Jr.
Attorney

Reissued Feb. 4, 1936 Re. 19,845

UNITED STATES PATENT OFFICE 19,845

GUY WIRE PROTECTOR

Herbert E. Miller, Allentown, Pa., assignor to Utilities Service Company, Inc., Allentown, Pa., a corporation of Pennsylvania Original No. 1,902,414, dated March 21, 1933, Serial No. 519,187, February 28, 1931. Application for reissue October 26, 1934, Serial No. 750,232

16 Claims. (Cl. 189—31.5)

This invention relates to guy wire protectors, and is an improvement over the structure disclosed in my copending application Serial No. 504,920, filed December 26, 1930.

As stated in my copending application referred to, the commonly employed sheet metal coverings for guy wires are fairly satisfactory in operation, but possess two serious disadvantages. In the first place, considerable labor is involved in placing the devices in position and securing them to the guy wires, and it is necessary to provide relatively expensive fastening means, such as U-bolts and similar devices, for securing the protectors in position.

An important object of the present invention is to provide a guy wire protector which is simple in construction and cheap to manufacture, and which may be placed in position without the use of separate fastening elements.

A further object is to provide a guy wire protector of unitary construction which may be readily and quickly placed in position and will remain in such position until removed.

A further object is to provide means for anchoring the lower end of the protector by utilizing a portion of the fastening means usually provided for securing the guy wire to its anchor, and to provide means for utilizing the guy wire itself for anchoring the upper end of the protector.

A further object is to provide novel means at the upper end of the protector for engaging the guy wire to prevent lateral movement of the protector, and which means permits the protector to be quickly and easily placed in operative position.

A further object is to provide a novel guy wire protector which may be quickly and easily placed in operative position without the use of separate fastening elements and which will remain tightly in position for an indefinite length of time without rattling or becoming loose.

Other objects and advantages of the invention will become apparent during the course of the following description.

In the drawing I have shown one embodiment of the invention. In this showing,

Figure 1:
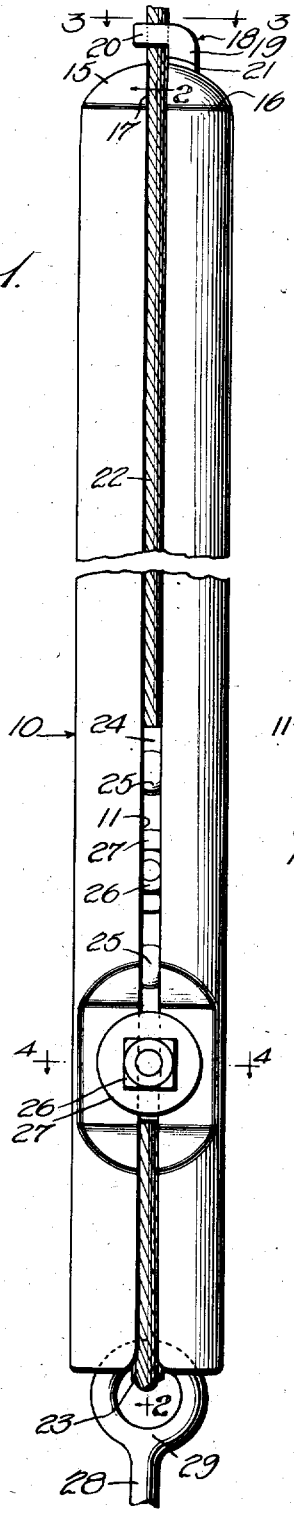
Figure 1 is a side elevation showing the device in operative position.

Referring to the drawing, the numeral 10 designates the body of the device which is preferably formed of sheet metal, and substantially cylindrical in cross section. The body is split throughout its length as at 11 to provide a space for the insertion of the guy wire. The lower end of the split 11 is flared outwardly as shown in Figure 1. The body is provided with an inwardly stamped portion 12 forming a seat 13 for a purpose to be described. Substantially centrally of the seat 13, the edges of the body are cut away to provide a bolt receiving opening 11'.

Figure 2:
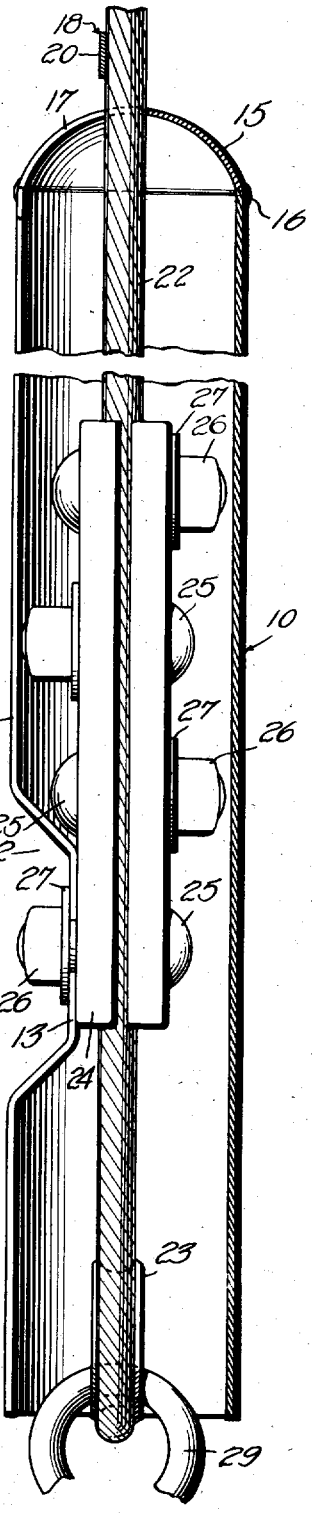
Figure 2 is a central transverse sectional view on line 2—2 of Figure 1.
Figure 3:
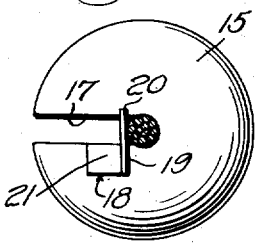
Figure 3 is a section on line 3—3 of Figure 1.
Figure 4:
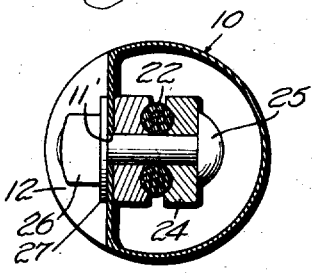
Figure 4 is a similar view on line 4—4 of Figure 1.

The bottom of the body 10 is open, as shown in Figure 2, while the top of the body is closed by a cap 15. This cap is preferably formed of stamped steel and is welded to the body 10 as at 16 or otherwise secured as by riveting. The cap 15 is provided with a slot 17 forming a continuation of the split 11 in the body. A retaining member 18 is carried by the cap 15. This retaining member has an upwardly extending arm 19 arranged substantially parallel to the axis of the body 10 and is provided at its upper end with a laterally extending arm 20 spaced from the top of the cap 15. The retaining member is provided with a foot 21 seating against and welded or otherwise secured to the cap 15 to one side of the slot 17.

The device is shown in position on the guy wire and its associated elements. The guy wire is indicated by the numeral 22, and near the bottom of the body 10, this wire passes around a thimble 23. The free end of the guy wire is secured to the body thereof by complementary clamping members 24 of the conventional type, the two sections of the clamp being secured together by bolts 25. Each bolt 25 carries a nut 26 beneath which is preferably arranged a washer 27.

An anchor rod 28 is adapted to secure the guy wire to the ground. The anchor rod is of the conventional type having an eye 29 at its upper end engaging the thimble 23.

The operation of the device is as follows:

The guy wire is erected in the usual manner except that one of the nuts 26 and its washer 27 are not applied to the corresponding bolt. The body of the device is then placed in position by arranging the body in a tilted position with the guy wire between the arm 20 and the top of the cap 15, and with the split 11 opening downwardly. The operation referred to takes place with the body arrangd wholly above the guy wire clamp, after which the body 10 is swung inwardly and downwardly until the guy wire is arranged wholly within the body.

After the guy wire has been arranged within the body in the manner referred to, the body is moved downwardly longitudinally of the guy wire until the free end of the proper bolt 25 snaps into the opening 11'. This operation takes place with the axes of the bolts 25 arranged in a plane parallel to the seat 13, that is, with the bolts arranged at right angles to their relative positions shown in Figure 2. Thus the body may be moved to a position wherein the desired bolt 25 is arranged in the transverse plane of the opening 11', whereupon the body may be revolved and the extended end of the bolt inserted through the opening. The remaining washer 27 and nut 26 are then applied to the bolt, and the device is completely assembled.

It will be noted that the seat 13 engages flat against the outer face of one of the sections of the clamp, and that the bolt which secures the body to the clamp holds these elements permanently in fixed relation with respect to each other. It also will be noted that the guy wire will be arranged centrally of the body. Accordingly the device does not need the provision of any separate fastening means but utilizes one of the bolts already provided in the conventional clamp in order that the body may be permanently fixed in position. It also will be apparent that looseness and rattling of the body will be effectively prevented.

It will be noted that the member 18 does not function as a securing hook, but purely as a retaining element. The space between the arm 20 and the top of the cap 15 permits the device to be placed in operative position in the manner referred to, while the lateral distance between the arm 20 and the inner extremity of the slot 17 corresponds to the diameter of the guy wire to prevent any lateral movement of the body in one direction with respect to the guy wire. Of course, the slot 17 prevents lateral movement of the upper end of the body in every direction except in alinement with the slot 17.

While the device has been shown connected to the lowermost bolt 25, it will be apparent that it may be connected to any of the bolts, it merely being necessary that the free end of the bolt to which the body is connected extend downwardly. It also will be apparent that several of the depressions 12 and their seats 13 may be provided in the body 10, if desired. With the slit 11 opening downwardly, the interior of the body and the elements therein willl be effectively protected against rain, snow, etc.

From the foregoing it will be apparent that the device is completely unitary and self contained, and it may be quickly and readily placed in operative position around a guy wire. The device permits marked economy in manufacture, and also permits a great saving to be effected in the labor cost involved in its installation.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a longitudinal body split to permit the insertion of a guy wire therein, means for fixing the lower portion of said body against movement with respect to the guy wire, a cap at the upper end of said body provided with a slot extending from the split in the body to a point substantially centrally of the cap, and a fixed retaining device adapted to contact with the guy wire at a point spaced from the cap longitudinally with respect to said body.

2. A device of the character described comprising a longitudinal body split to permit the insertion of a guy wire therein, means for fixing the lower portion of said body against movement with respect to the guy wire, a cap at the upper end of said body provided with a slot extending from the split in the body to a point substantially centrally of the cap, and a retaining device having its lower end fixed to said cap and its upper end extending transversely of the guy wire and adapted to contact therewith at the side thereof opposite the inner end of said slot and at a point spaced from said cap.

3. A device of the character described comprising a longitudinal body split to permit the insertion of a guy wire therein, means for anchoring the lower end of the body against movement with respect to the guy wire, a cap at the upper end of said body provided with a slot extending from the split in the body to a point centrally of the cap, and a retaining member including a longitudinal shank at one side of said slot secured to the cap and a transverse integral arm spaced from the cap and adapted to contact with the guy wire at a point opposite the inner end of said slot.

4. A device of the character described comprising a substantially cylindrical sheet metal body split longitudinally throughout its length to permit the insertion of a guy wire therein, means for anchoring the lower end of the body against movement with respect to the guy wire, a stamped sheet metal cap secured to the upper end of said body and provided with a slot extending from the split in the body to a point centrally of the cap, and a sheet metal member for retaining the upper end of the body against movement with respect to the guy wire, said member including a foot secured to the cap at one side of the slot therein, a shank extending upwardly from said foot longitudinally of the body, and an arm extending laterally from the upper end of said shank at a point spaced from said cap and adapted to contact with the guy wire at the side thereof opposite the inner end of said slot.

5. A device of the character described comprising a longitudinal body split throughout its length to permit the insertion of a guy wire therein, said body being stamped inwardly adjacent its lower end to provide a flat relatively long seat adapted to engage against the outer face of one section of the guy wire clamp and having an opening for the free end of one of the clamp bolts to permit the nut thereof to be turned inwardly against the outer face of the seat, a cap at the upper end of said body provided with a slot extending from the split in the body to a point substantially centrally of the cap, and a retaining device fixed with respect to said cap and having a portion adapted to contact with the guy wire at a point spaced above the cap at the side of the wire opposite the inner end of said slot.

6. The combination with a guy wire having an anchor, a two-piece clamp for securing the guy wire to the anchor, and fastening bolts for the clamp, of a split longitudinal body adapted to receive the guy wire, said body being stamped inwardly adjacent its lower end to provide a flat seat of substantial area adapted to engage against the outer face of one section of the clamp and having an opening for the free end of one of the clamp bolts to permit the nut thereof to be turned inwardly against the outer face of the seat, and a retaining device fixed with respect to said body and adapted to position the upper end of the latter with the guy wire arranged centrally thereof.

7. The combination with a guy wire having an anchor, a two-piece clamp for securing the guy wire to the anchor, and fastening bolts for the clamp, of a split longitudinal body adapted to receive the guy wire, said body being stamped inwardly adjacent its lower end to provide a flat seat of substantial area adapted to engage against the outer face of one section of the clamp and having an opening for the free end of one of the clamp bolts to permit the nut thereof to be turned inwardly against the outer face of the seat, a cap at the upper end of said body provided with a slot extending from the split in the body to a point substantially centrally of the cap, and a retaining device fixed with respect to said cap and adapted to contact with the guy wire at a point spaced above the top of the cap to hold the latter with the guy wire arranged in the inner end of said slot.

8. The combination with a guy wire having an anchor, a two-piece clamp for securing the guy wire to the anchor, and fastening bolts for the clamp, of a split longitudinal body adapted to receive the guy wire, said body being stamped inwardly adjacent its lower end to provide a flat seat of substantial area adapted to engage against the outer face of one section of the clamp and having an opening for the free end of one of the clamp bolts to permit the nut thereof to be turned inwardly against the outer face of the seat, a cap secured to the upper end of said body and provided with a slot extending from the split in the body to a point substantially centrally of the cap, and a retaining device having its lower end fixed to said cap and its upper end extending transverely of the guy wire and adapted to contact therewith at the side thereof opposite the inner end of said slot and at a point spaced from said cap.

9. The combination with a guy wire having an anchor, a two-piece clamp for securing the guy wire to the anchor, and fastening bolts for the clamp, of a substantially cylindrical sheet metal body split longitudinally to receive the guy wire, said body being stamped inwardly adjacent its lower end to provide a flat seat of substantial area adapted to engage against the outer face of one section of the clamp and having an opening for the free end of one of the clamp bolts to permit the nut thereof to be turned inwardly against the outer face of the seat, a cap secured to the upper end of said body and provided with a slot extending from the split in the body to a point substantially centrally of the cap, and a retaining device comprising an integral member having a foot portion secured to said cap, a shank extending upwardly from the cap at one side of said slot, and a transverse arm at the upper end of said shank spaced from said cap and adapted to contact with the guy wire at the side thereof opposite the inner end of said slot.

10. A device of the character described comprising an elongated sheet metal body split longitudinally to receive a guy wire, said body being stamped inwardly adjacent its lower end to provide a flat seat of substantial area adapted to engage against the outer face of one section of the clamp and having an opening for the free end of one of the clamp bolts to permit the nut thereof to be turned inwardly against the outer face of the seat, and means for fixing the upper end of said body against lateral movement with respect to the guy wire.

11. A device of the character described comprising an elongated sheet metal body split longitudinally to receive a guy wire, said body being stamped inwardly adjacent its lower end to provide a flat seat of substantial area adapted to engage against the outer face of one section of the clamp and having an opening for the free end of one of the clamp bolts to permit the nut thereof to be turned inwardly against the outer face of the seat, and a retaining device fixed with respect to said body and adapted to position the upper end of the latter with the guy wire arranged centrally thereof.

12. A guy guard comprising a trough-shaped length of material adapted to be positioned around a clamped strand, a depression in said length having an opening therein and means for fastening said length to the strand clamp through said opening, said depression nesting said fastening means to prevent substantial protrusion thereof above the mean surface of said length of material.

13. A guy guard comprising a trough-shaped length of material adapted to be positioned around a clamped strand, a depression in said length having an opening therein and means for fastening said length to the strand clamp through said opening, said depression nesting said fastening means to prevent substantial protrusion thereof above the mean surface of said length of material, said depression being between the ends of said length.

14. In combination, a guy wire structure including a guy wire and a plurality of structural elements for clamping and anchoring said guy wire, a guy guard adapted to be positioned over said guy wire, a depression in said guy guard having an opening therein, and means, including a portion carried by said guy wire structure independently of said guy guard, for attaching said guy guard to said guy wire structure through said opening, said depression nesting a portion of said attaching means to prevent substantial protrusion of the attaching means above the mean surface of said guy guard, said attaching means having a portion overlying a portion of said guy guard adjacent said opening.

15. In combination, a guy wire structure including a guy wire and a plurality of structural elements for clamping and anchoring said guy wire, a guy guard adapted to be positioned over said guy wire, a depression in said guy guard having an opening therein, and means, including a member carried by one of said structural elements independently of said guy guard, for attaching said guy guard to said guy wire structure through said opening, said depression nesting a portion of said attaching means to prevent substantial protrusion of the attaching means above the mean surface of said guy guard, said attaching means having a portion overlying a portion of said guy guard adjacent said opening.

16. In combination, a guy wire structure including a guy wire and a plurality of structural elements for clamping and anchoring said guy wire, a guy guard adapted to be positioned over said guy wire, a depression in said guy guard having an opening therein, and means including a portion carried by said guy wire structure independently of said guy guard for attaching said guy guard to said guy wire structure, said means including a single end portion insertable through said opening from within said guy guard, said depression nesting a portion of said attaching means to prevent substantial protrusion of the attaching means above the mean surface of said guy guard, said attaching means having a portion overlying a portion of said guy guard adjacent said opening.

HERBERT E. MILLER.